United States Patent [19]
Green

[11] Patent Number: 4,737,014
[45] Date of Patent: Apr. 12, 1988

[54] CONTROLLABLE OPTICAL WAVEGUIDE

[76] Inventor: Mino Green, c/o Department of Electrical Engineering, Imperial College of Science and Technology, London, England, SW7 2BT

[21] Appl. No.: 698,949

[22] Filed: Feb. 7, 1985

[51] Int. Cl.$^4$ .............................................. G02B 6/16
[52] U.S. Cl. .............................. 350/96.29; 350/96.14; 350/96.32; 350/96.34; 350/347 V
[58] Field of Search ............... 350/96.14, 96.29, 96.30, 350/347 V, 334, 96.34, 96.32, 96.13

[56] References Cited

U.S. PATENT DOCUMENTS

| | | | |
|---|---|---|---|
| 3,838,908 | 10/1974 | Channin ............................. | 350/334 |
| 3,871,747 | 3/1975 | Andrews ........................... | 350/96.14 |
| 3,963,310 | 6/1976 | Giallorenzi et al. ............. | 350/334 X |
| 3,980,395 | 9/1976 | Giallorenzi et al. ............. | 350/347 R |
| 4,054,362 | 10/1977 | Baues ................................ | 350/96.14 |
| 4,201,442 | 5/1980 | McMahon et al. ............... | 350/96.14 |
| 4,354,735 | 10/1982 | Stowe et al. ...................... | 350/96.29 |
| 4,516,837 | 5/1985 | Soref et al. ...................... | 350/96.15 X |
| 4,600,310 | 7/1986 | Cramp et al. .................... | 350/96.29 X |

FOREIGN PATENT DOCUMENTS

| | | | |
|---|---|---|---|
| 0158616 | 9/1982 | Japan ................................ | 350/96.15 |
| 1396433 | 6/1975 | United Kingdom . | |
| 1536518 | 12/1978 | United Kingdom . | |

OTHER PUBLICATIONS

Schnur et al., "Prospectus for the Development of Liquid-Crystal Waveguides", *Naval Research Laboratory*, NRL Report 7507, pp. 1-18, (Nov. 1972).

Hu et al., "Optical Deflection in Thin-Film Nematic-Liquid-Crystal Waveguides", *IEEE Journal of Quantum Electronics*, vol. QE-10, No. 2, pp. 218-222, (2/1974).

*Primary Examiner*—John Lee
*Attorney, Agent, or Firm*—Flynn, Thiel, Boutell & Tanis

[57] ABSTRACT

A controllable optical waveguide includes a core through which light can propagate and cladding around the core, at least one of the core and cladding having plural portions made of a material having a refractive index which varies in response to an applied electric field. A plurality of electrode pairs are arranged so as to each be able to apply an electric field to a respective one of the portions of the material in a manner effecting a change in its refractive index. Each electrode pair includes two electrodes which each have a plurality of fingers, the fingers of one electrode of each pair being interdigitated with those of the other electrode of the pair. As the electric field produced by a given electrode pair varies, the refractive index of the corresponding portion of the material varies in a manner causing the waveguide to retain light or to allow light to escape through such portion.

16 Claims, 4 Drawing Sheets

CONTROLLABLE OPTICAL WAVEGUIDE

FIELD OF THE INVENTION

BACKGROUND OF THE INVENTION

The present invention relates to controllable optical waveguides and optical displays employing such waveguides.

Figure 1:
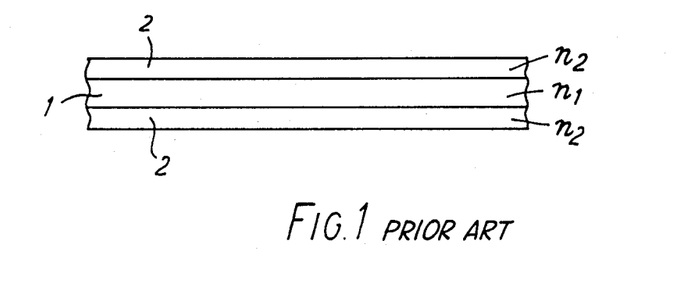
FIG. 1 is a schematic diagram (referred to above) of a conventional optical waveguide.

As is well known, an optical waveguide consists (as illustrated in FIG. 1) of a core 1 of a first refractive index $n_1$ surrounded by cladding 2 of a second lower refractive index $n_2$. Light propagating in the core 1 will suffer total internal reflection at the interface with the cladding 2 provided that its angle of incidence $\theta$ is less than the critical value $\cos^{-1} n_2/n_1$. Thus the light is guided within the core. This simple optical analysis assumes (as will usually be the case) that the dimensions of the waveguide are large compared with the wavelength of the light, so that the waveguide behaves in a multimode fashion.

SUMMARY OF THE INVENTION

According to the present invention there is provided a controllable optical waveguide comprising a core for the propagation of light, and cladding around the core, at least part of the core or cladding being of a material having a refractive index which varies in response to an applied electric field, and further comprising a first plurality of electrode pairs arranged to apply an electric field to corresponding regions of the material to effect a change in its refractive index, the electrodes each having a plurality of fingers and the fingers of one electrode of each pair being interdigitated with those of the other electrode of the pair, so that the refractive index of individual regions may be controlled to cause the waveguide to retain light or to allow light to escape.

The waveguide may be rendered leaking by decreasing the refractive index $n_1$ of part of the core, or by increasing the refractive index $n_2$ of part of the cladding.

The capability of the waveguide of permitting light to escape at selected regions along its length allows it to be used as a display device. Optical memory may he provided at each location, for instance by incorporating a phosphor, so that a composite image may be built up by allowing light to leak sequentially from a series of portions of the waveguide.

BRIEF DESCRIPTION OF THE DRAWINGS

Some embodiments of the invention will now be described, with reference to the accompanying drawings, in which.

DETAILED DESCRIPTION

Figure 2:
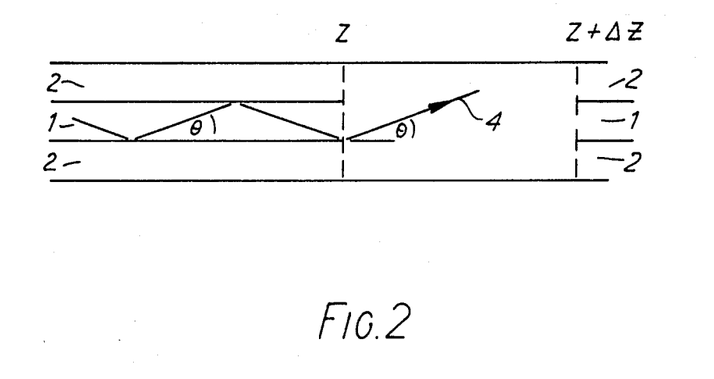
FIG. 2 is a schematic diagram of a waveguide illustrating the principles of the present invention.

FIG. 2 illustrates an optical waveguide whose light output may be spatially modulated in order to produce a display on the waveguide surface. The waveguide is multimode, so that the light rays will propagate down the waveguide at all angles from zero up to the critical angle $\theta_c$. At the point Z and for some distance $\Delta Z$ beyond, the refractive index of the core is less than or equal to that of the cladding, i.e. $n_1 \leq n_2$. The arrangement thus becomes non guiding in this region and the light pours into the cladding at angles up to $\theta_c$, as indicated at 4. The limited region of leakage may be used as an image point in a display.

It is necessary that the angle $\theta_c$ be reduced, and hence $n_2/n_1$ be increased, by varying $n_1$ or $n_2$ or both. If the reduction is only partial then only a portion of the light will escape, the remainder (i.e. that propagating at angles less than the new value of $\theta_c$) remaining within the core of the waveguide. Thus, only a very slight change in refractive index is required for the higher order modes to become non-guiding, but for the intensity to be large, the ratio $n_2/n_1$ must increase to near unity.

In principle, any convenient means of changing the refractive index may be employed. For example an experimental waveguide consisted of a hollow glass fibre (cladding) of refractive index 1.50 and a core of silicone oil whose refractive index varied from 1.52 at room temperature to 1.50 at 74° C. Selected portions of the waveguide could be rendered light-emitting by varying the temperature.

In a preferred practical arrangement, however, the properties of a liquid crystal are utilised.

The term liquid crystal is given to these materials because although they are liquid in form they possess certain properties of crystals. For instance, they possess certain material anisotropies which arise from the ordering of their molecules. The three main crystals of interest are Nematic, Cholesteric and Smectic. In each, the molecules are cigar shaped and it is the relative orientation of these molecules which determines the liquid crystal types and their material anisotropies. The axial orientation of cigar-shaped molecules is represented mathematically by a vector called the "director". In the present description only the nematic and cholesteric liquid crystals will be described in any detail. In a nematic liquid crystal, the directors of all the molecules are parallel but the molecules are randomly arranged perpendicular to their directors. A cholesteric liquid crystal comprises molecules with directors arranged in a helical fashion across the material. A complete turn of the helix is said to extend one pitch length along the helix axis.

In the present invention the main anisotropy taken advantage of to influence the light-guiding properties, is the dielectric anisotropy, determining the refractive index anisotropy, or birefringence, of the material. The dielectric anisotropy is defined as:

$$\Delta\epsilon = \epsilon_\| - \epsilon_\perp$$

where $\epsilon_\|$ is the dielectric constant in the direction parallel to the director and $\epsilon_\perp$ is the dielectric constant in the perpendicular direction. If the dielectric anisotropy is greater than zero then the liquid crystal is said to have a positive dielectric anisotropy. We are here concerned with the low frequency ($<10^7$ Hz) dielectric properties.

The refractive index anisotopy gives rise to the electro-optic properties of the liquid crystal. It is important to appreciate that under the influence of an electric field, liquid crystal molecules tend to align such that the relative permittivity is a maximum along the field direction. For instance, if a positive dielectric anisotropy liquid crystal is used, its director will always align in the direction of the applied electric field, and if it was arranged so that its director lay perpendicular to the field in the first place, e.g. by surface attachment treatment, then the director will rotate through ninety degrees under the influence of the field. This is the principle used in the twisted-nematic liquid crystal display.

Figure 3:
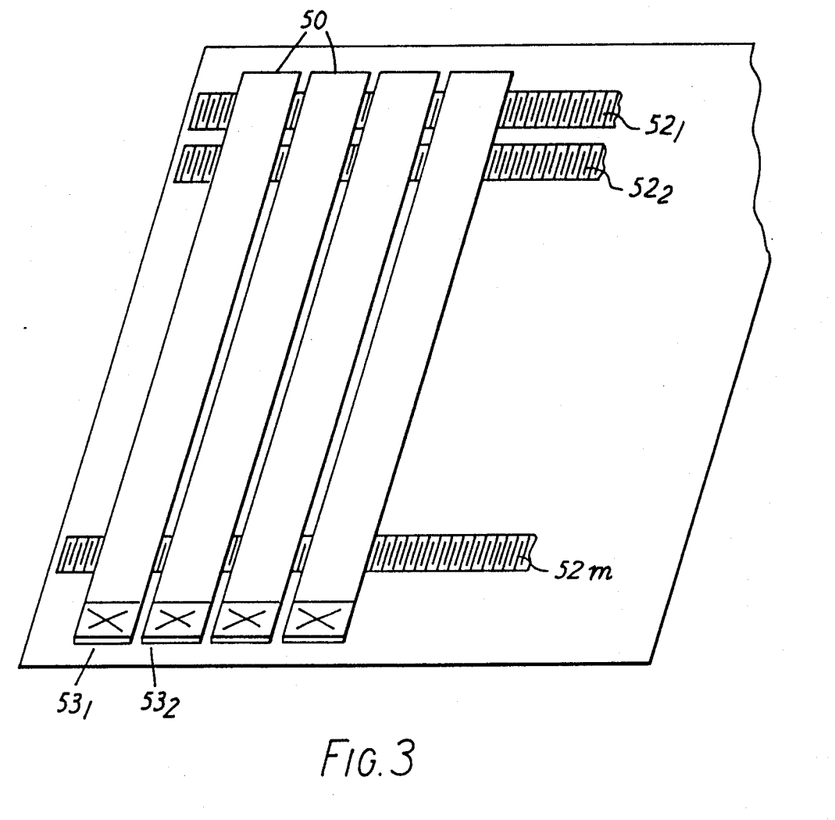
FIG. 3 is a perspective view of a matrix display device according to an embodiment of the invention.

A display embodying the invention is shown in FIG. 3. This is arranged as a rectangular display matrix with a plurality N of parallel optical waveguides 50, forming the columns of the matrix. Each guide has M selectable "window" areas actuable by respective electrode pairs, common to all the columns. The cladding comprises portions of nematic liquid crystal material. Thus there are M pairs of row electrodes actuable to "open" a row of windows, one in each column.

Light is supplied to the input ends $53_1 \ldots 53_n$ of each waveguide, either from N separate light sources, or from a single light source via an optical gating arrangement, which may comprise an optical gate at the end of each waveguide.

Obviously it is only possible to select one row at a time, so the display must be multiplexed, the rows being actuated in succession, suitably by means of a recirculating shift regster controlling drive circuitry for each of the M row electrode pairs in succession. Separate light sources may be used for each column or a single light source can be used, an individually controlled optical switch or modulator being provided for each waveguide, to control the amount of light entering the waveguide.

The time taken for a complete display to be created will depend on the slowest liquid crystal response time (determining the row switching rate) and the number of rows.

If a row switching period of between 10 and 100 ms is used with the liquid crystal described, then an 80 row display will have a frame period of in the region of 0.8 to 8 seconds. This period is too long for the human persistence of vision to record a single image; this problem may be countered by covering the outer surface of the cladding of the waveguide with a phosphor, which is activated by the input light (towards the blue end of the spectrum) to provide an output of visible light, thereby giving the necessary persistence. However, for smaller displays or with improved response times, this would not be necessary. Times for the phase change effect as low as 30 μs have been recorded in the literature (see E Jakeman and E P Raynes: "Electro-optic Response Times in Liquid Crystals", Physics Letters, 39A, p69, 1971).

It will be appreciated that the light source may be modulated to vary the intensity of the display, to provide varying shades of grey (or other colour), i.e. half-tones. Additionally, a colour display may be effected by using three modulatable light sources, as in the case of color televisions, of the three primary colours or, where phosphors are used, of three (for example) wavelengths in the blue to ultra-violet region with composite phosphors responsive to the distinct wavelengths to produce the desired colors.

Figure 4:
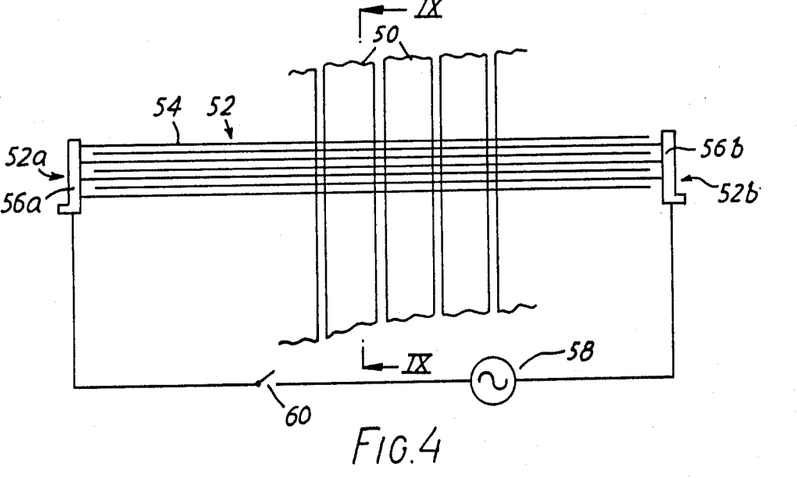
FIG. 4 is a schematic partial representation of the display of FIG. 3.

FIG. 4 illustrates schematically part of the display device. Parallel waveguides 50 (only five of which are shown) are controlled by pairs of electrodes 52 (only one pair being shown) on the viewing side of the device. Each electrode 52a, 52b comprises a plurality of parallel, coplanar fingers 54 extending from contacts 56a, 56b. The fingers of the two electrodes 52a, 52b are interdigitated, and extend generally transversely of the waveguides 50. The two terminals of a voltage supply (shown schematically as an A.C. voltage supply 58 and switch 60) are electrically connected to respective contacts 56a, 56b. When the switch 60 is closed, the supply voltage generates, across the fingers 54, an electric field parallel to the waveguides 50. The electrodes are so positioned in relation to the liquid crystal cladding of the waveguides 50 that the electric field aligns the molecules of the cladding along the waveguide, that is, the directors become axially aligned.

Figure 5:
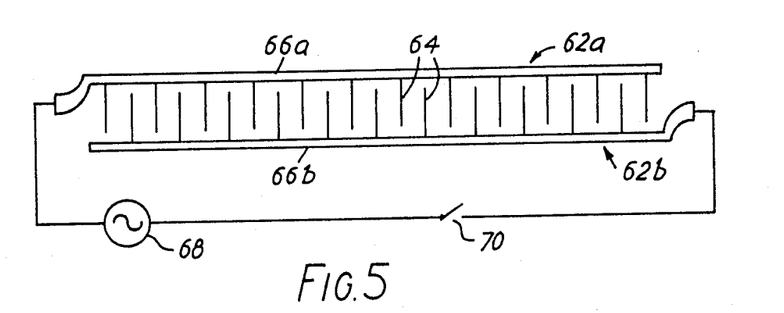
FIG. 5 shows a pair of electrodes for use in the display of FIGS. 3 and 4.

In this embodiment, the light entering the waveguides 50 is polarised (by means not shown) in a direction parallel to the face of the waveguide. With the field off, the liquid crystal molecules are aligned transversely of the waveguide by surface alignment forces produced by chemical treatment of the surface of the waveguide core. The molecules have a high refractive index for light polarised in the parallel direction (n 1.7), so that the guide will be non guiding and light would be permitted to escape over that region. With the field on, the molecules rotate through 90°, reducing the refractive index and preventing light from escaping. One difficulty with this arrangement is that the recovery time of the crystal, when the field is turned off, is long compared with the turn-on time. In a modified version, therefore, a second electrode arrangement is included, for use in conjunction with that of FIG. 4, as illustrated in FIG. 5.

A pair of electrodes 62, 62b is provided for each pair of electrodes 52a, 52b in the display. Each electrode 62a, 62b comprises a plurality of parallel, coplanar fingers 64 extending from contacts 66a, 66b. The fingers of the two electrodes 62a, 62b of the pair are interdigitated. Again, a voltage supply is electrically connected to respective contacts 66a, 66b, and shown as an A.C. voltage supply 68 and a switch 70. In the display device, the electrodes 62a, 62b are positioned between the waveguide 50 and the corresponding pair of electrodes 52a, 52b with the fingers 64 extending at right angles to the fingers 54 and parallel to the waveguides 50. Electrical insulation is provided between the electrode pairs. When the switch 70 is closed, the supply voltage appears across the fingers 64, aligning the director of the liquid crystal cladding transverse to the waveguide, and parallel to the boundary between the core and cladding.

While the electrodes 62a, 62b have been described as being positioned between the waveguides 50 and the electrodes 52a, 52b, clearly the positions of the electrodes 62a, 62b and the electrodes 52a, 52b could be reversed, provided that both pairs of electrodes are so positioned in relation to the liquid crystal cladding, that a voltage applied across the electrodes 52a, 52b or the electrodes 62a, 62b tends to align the liquid crystal molecules in respective directions.

In this embodiment, the light entering the waveguides 50 is polarised (by means not shown) in a direction transverse to the direction of propagation along the waveguide and parallel to the boundary between the core and the cladding.

With switch 60 open, the molecules of the waveguide cladding will be transversely aligned if switch 70 is closed and the waveguide will be leaky. If, then, switch 60 is closed (and switch 70 is simultaneously opened) the waveguide will become guiding, with the molecules axially aligned in a time characterised by a time constant $\tau$, where $$\tau = \frac{\gamma 4\pi}{\Delta \epsilon E^2},$$

and where $\gamma$ is a rotational viscosity term, $\Delta \epsilon$ is the difference between the dielectric constant of the material parallel and perpendicular to the director, and E is the magnitude of the applied electric field. The equation for $\tau$ ignores the effect of any surface alignment forces which may be present. These would usually increase.

Now, when the switch 60 is opened (and the switch 70 is closed), the voltage across the electrodes 62a, 62b aligns the molecules transversely and the guide becomes non-guiding again in a time characterised by $\tau$. With both electrode pairs present, the arrangement allows the director of the liquid crystal to be rotated quickly and positively, that is, without having to rely on surface alignment forces to randomise or reorient the orientation of the molecules when the electric field is switched off. The surface of the liquid crystal material in contact with the electrodes is preferably treated with an anti-alignment agent, that is an agent which prevents the electrode surface giving rise to a preferred direction of orientation of the liquid crystal molecules. Dichloro dimethyl silane ($SiCl_2(CH_3)_2$) is a suitable anti-alignment agent. The use of an anti-alignment agent reduces the turn-on and turn-off times, because the electric fields no longer have to work against alignment forces. It is thought that, with known liquid crystals, by using anti-alignment agents, $\tau$ may be reduced sufficiently to allow a liquid crystal display device according to the invention to be used as a television display.

For some applications it may be satisfactory to use only one pair of electrodes 52, 62 and to use surface alignment forces in place of the second pair. Methods for producing surface alignment forces are well known, and include chemical treatment or physical treatment (e.g. grooving) of surfaces adjacent the liquid crystal.

The insulating layer between the two electrode pairs may be, for instance, a 1 $\mu$m thick layer of silicon dioxide or polyamide polymer.

The electrodes may be produced on a transparent substrate by a lithographic technique and preferably the fingers have a mark-space ratio of not more than 1:10, i.e. the electrode spacing should be at least ten times the electrode width to prevent the electrode optically or electrically screening each other or the waveguides.

A set of electrode pairs is provided in the display for each display row required, and a waveguide is provided for each column. At every intersection of a waveguide and an electrode set, an image element exists which is individually-addressable by directing light down the corresponding waveguide and applying a voltage across the corresponding electrode pair transversely to align the cladding molecules to cause the waveguide locally to leak.

Figure 6:
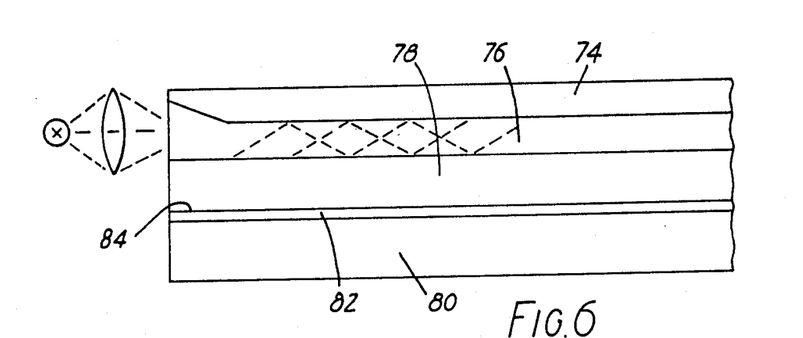
FIG. 6 is a section of the device of FIG. 4, along line IX—IX.

FIG. 6 is a section of the display device of FIG. 4 incorporating the electrodes of FIG. 5 along the axis of a waveguide 50. It will be appreciated that the waveguide cladding at the rear (non-display) face is not required to change its refractive index, and hence does not need to be of liquid crystal. Thus the display device is supported on a glass or plastic rear plate 74 which forms the waveguide cladding on one side of the core 76. On the other side of the core, the cladding is formed by a 0.01 mm thick layer of liquid crystal material 78. Liquid crystal sold under the name British Drug House E47 has been used, and has a refractive index of 1.76 along the director and 1.52 perpendicular to the director. The refractive index of the plate should be less than or equal to the minimum liquid crystal value, i.e. 1.5 and of the core should be equal to the maximum liquid crystal value, i.e. 1.7. The core may separate the liquid crystal 78 and the plate 74 by 0.1 mm and be 1 mm wide.

The electrodes of FIGS. 4 and 5 are supported on a glass or plastic front plate 80 at a position indicated by the numeral 82. They may be aluminium, having a thickness of 0.2 $\mu$m and a width of 2 $\mu$m. A thin layer, for instance 1 $\mu$m of phosphor 84, is provided between the liquid crystal material 78 and the electrodes 82, to provide sufficient image persistance to allow a large composite image to be built up. If a phosphor is not used, a light scattering layer will be needed where, as here, the liquid crystal is clear, to scatter the light—which leaves the waveguide at low angles—and improve its visibility.

The display described, as well as having the advantages of not requiring surface alignment treatment (with two sets of electrodes) and having considerably enchanced response times, can, if phosphors or scattering media are used, also be used over a wide range of viewing angles.

Figure 7:
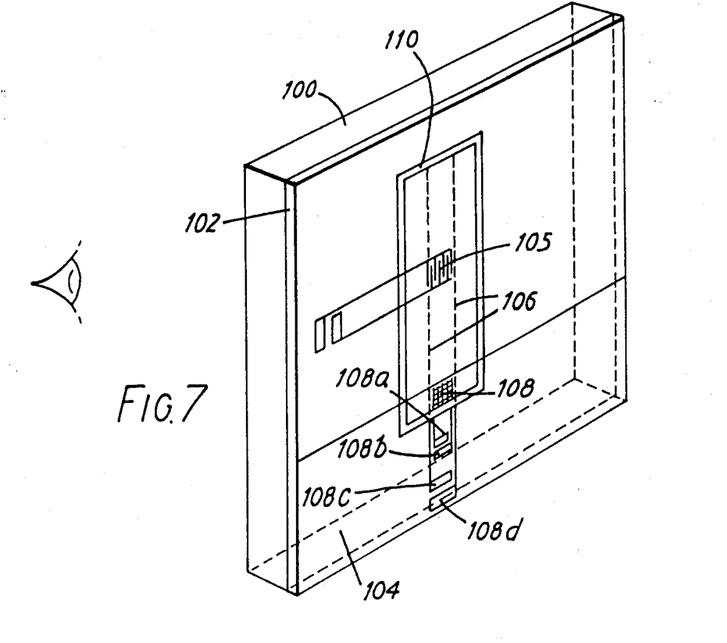
FIG. 7 is a perspective view, schematic in part, of a single cell display according to another embodiment of the invention.

FIG. 7 shows schematically a single cell display having an alternative construction to that shown in FIG. 6. The display of FIG. 7 can be enlarged by the addition of further cells to provide a large display similar to that shown in FIG. 3.

The display is built on a support plate 100 which is transparent. One surface of the plate is roughened to scatter light. A thin sheet of glass 102 is bonded to the plate 100 by an adhesive which is transparent when set. A region 104 at the bottom of the glass sheet 102 is coated with a light absorbent material, for reasons which will be explained below.

A pair of interdigitated electrodes 105 are produced on the glass 102, for instance by lithography, to control the refractive index of the cladding of the waveguide at the cell. In the completed display, the waveguide is in the region between the dotted lines 106 shown in FIG. 7.

A second pair of interdigitated electrodes are formed by lithography on the absorbent layer 104 in the region 108 and have fingers parallel to the waveguide. A pair of contacts 108a, 108b are provided by means of which a voltage may be applied across the second pair of electrodes.

The second pair of electrodes are covered by a layer of an electrically insulating material (for instance a layer 1 μm thick of a polyimide). On this layer, a third pair of interdigitated electrodes are formed by lithography with fingers transverse to the waveguide. Two contacts 108c, 108d allow a voltage to be applied across the third pair of electrodes.

The top surface of the third electrode pair and the exposed surface of the insulating layer are treated with a substance such as dimethyl-dichloro-silane which weaken the attachment between the surface and the liquid crystal molecules to be used in the waveguide cladding. The surface of the glass plate 102 between the lines 106 and above the layer 104, including the region at the first pair of electrodes 105, is treated with a compound, for instance a chromium compound, which induces homeotropic alignment (alignment perpendicular to the surface of the plate) in the liquid crystal molecules of the waveguide cladding.

A gasket 110 is then attached to the rear of the structure, and the liquid crystal material which will form the waveguide cladding on the viewing side of the waveguide is deposited on the plate 102, in the area defined by the gasket. A stick of glass (not shown) is laid on the liquid crystal material in the region between the lines 106, from the top of the gasket 110 over the electrodes 105 and over the region 108. Finally, a back plate (not shown) is mounted behind the waveguide core to provide the waveguide cladding at the rear of the display. The back plate comprises a glass prism which is in contact with the waveguide core in the assembled display, and through which light may be fed into the waveguide core below the region 108.

The refractive index of the cladding at 108 depends on whether a voltage is applied to the electrodes 108a, b or 108c, d, and the light entering the core through the prism is either leaked from the waveguide and absorbed by the material 104, or is transmitted along the waveguide to the display cell at the electrode pair 105. At the electrode pair 105, light in the waveguide is leaked from the waveguide, to turn the cell on, or is retained in the waveguide, depending on whether or not a voltage is applied across the electrodes of the pair 105.

A large multi-cell display can be built up from the display of FIG. 7 as follows. A number of parallel waveguides are formed side by side in the manner described, each having a corresponding prism (or a corresponding part of a single prism) through which light may enter that waveguide. A light gate formed by electrodes like those at 108 is provided for each waveguide, so that, by applying appropriate voltages to the electrodes 108, light can be allowed to continue along only one waveguide at any time. The electrodes of the pair 105 are provided with interdigitated fingers at each waveguide, so that a voltage across a pair of electrodes turns on a row of display cells, one on each waveguide. However, light can only leave at one of these cells, by virtue of the operation of the gate at 108 and the equivalent gates on the other waveguides.

Further sets of electrode pairs like the pair 105 are provided, so that a complete array of cells is formed, the cells being individually addressable by selecting a waveguide into which light is to be allowed, and a pair of electrodes 105 to turn on one cell on the selected waveguide.

Figure 8:
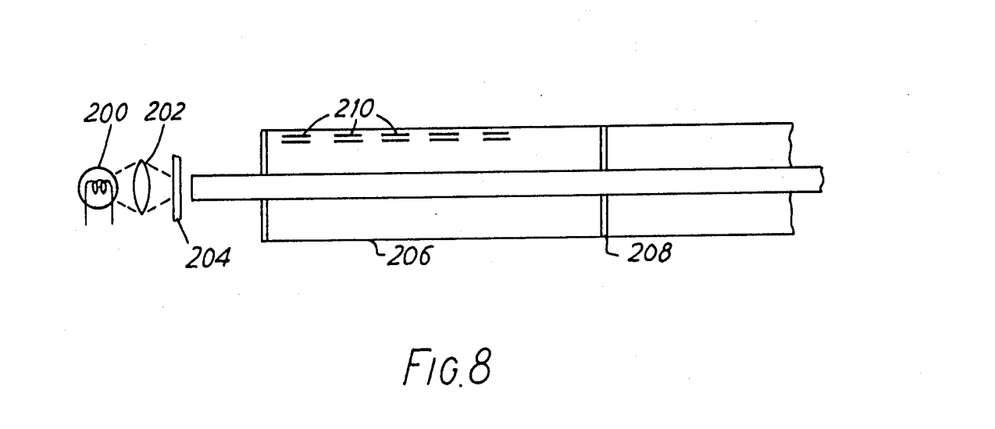
FIG. 8 is a schematic diagram of a light gate embodying the invention.

FIG. 8 schematically shows a modulatable light gate, which can be incorporated in the display of FIGS. 3 to 6 or 7. Light from a light source 200 is focussed onto the end of the core of each of the waveguides 50 by a lens 202 and is polarised by a polariser 204.

A terminal portion 206 of the waveguide cladding is separated from the remainder of the cladding by an expoxy seal 208 and is formed by liquid crystal material on both sides of the core. Between the end of the waveguide and the epoxy seal, there are a plurality of electrode pairs. At each position 210 there is a pair of interdigitated electrodes for aligning the cladding molecules along the waveguide and a pair for aligning the molecules transverse to the waveguide. A voltage may be applied across individually selectable pairs of electrodes to render the waveguide locally heavily leaking or guiding. Increasing the number of electrode pairs across which a voltage is applied to cause leaking, increases the amount of light leaking from the waveguide in the terminal portion 206 and hence reduces the amount of light entering the display portion of tbe waveguide. Accordingly, a grey scale of light intensity in the waveguide can be provided. A strip light source may be used (comprising one light source for each color in a color display) and focussed onto the ends of the waveguides by a cylindrical lens.

Incorporation of the optical gate of FIG. 8 in the display of FIG. 6 or FIG. 7 allows an image to be built up a line at a time using conventional electronics to control the electrode voltages. In principle, there is no upper limit to the size of a display produced. The use of phosphors on the viewing surface provides a viewing angle much greater than known, twisted nematic displays.

I claim:

1. A controllable optical waveguide, comprising:
a core through which light can propagate;
cladding provided around the core, the cladding having an outer surface on a side thereof remote from the core and including a plurality of portions made of a material having a refractive index which varies in respones to an applied electric field; and
a plurality of first electrode pairs, each of the electrode pairs including two electrodes located adjacent the outer surface of the cladding and arranged to apply an electric field to a respective one of the portions of the cladding, each of the electrodes having a plurality of fingers, and the fingers of one of the electrodes of each said pair being interdigitated with the fingers of the other electrode of such pair;
wherein a respective electric potential can be applied to each said pair of electrodes and, as the electric potential at one of the pairs of electrodes is changed from a first value to a second value, the refractive index of the corresponding portion of the cladding changes from a first value at which light propagating through the core and impinging on such portion of the cladding is reflected back into the core to a second value at which light propagating through the core and impinging on such portion passes through such portion and thereby escapes from the waveguide.

2. A waveguide according to claim 1, in which the material of which the portions of the cladding are made is a liquid crystal.

3. A waveguide according to claim 2, in which liquid crystal molecules in one of the portions of the cladding are aligned with a first orientation by an applied electric field, and further comprising means for polarising light entering the waveguide and means for reorienting the liquid crystal molecules to a second orientation different from the first orientation when the electric field is removed.

4. A waveguide according to claim 3, in which the means for reorienting the liquid crystal molecules comprises a surface which is in contact with the liquid crystal material and which is chemically treated to cause the liquid crystal molecules to be aligned with the second orientation.

5. A waveguide according to claim 4, in which the second orientation is perpendicular to the boundary between the core and cladding.

6. A waveguide according to claim 3, in which the means for reorienting the liquid crystal molecules comprises a plurality of second electrode pairs.

7. A waveguide according to claim 6, in which a surface in contact with the liquid crystal material is treated to reduce alignment forces which exist between the surface and the liquid crystal molecules and which urge the molecules to assume a predetermined orientation.

8. A waveguide according to claim 6, in which the electrodes of the second electrode pairs each have a plurality of fingers, the fingers of one electrode of each pair being interdigitated when the fingers of the other electrode of the pair.

9. A waveguide according to claim 8, in which the fingers of the first electrode pairs are mutually parallel, and the fingers of the second electrode pairs are mutually parallel and are perpendicular to the fingers of the first electrode pairs.

10. A waveguide according to claim 9, in which the liquid crystal is nematic and the first orientation is parallel to the boundary between the core and cladding, and perpendicular to the propagation direction of light in the waveguide.

11. A waveguide according to claim 10, in which the second electrode pairs are arranged to apply a field to the cladding to align the liquid crystal molecules parallel to the boundary between the core and cladding and parallel to the direction of propagation of light within the waveguide.

12. A waveguide according to claim 6, in which the second electrode pairs are provided adjacent the outer surface of the cladding, the second electrode pairs being separated from the first electrode pairs by a layer of an electrically insulating material.

13. A controllable optical waveguide according to claim 1, including means for causing said plurality of first electrode pairs to apply an electric field to a selectable number of the portions of the cladding, whereby the amount of light passed by the waveguide may be controlled.

14. A display device, comprising:
a plurality of controllable optical waveguides arranged side by side, each said waveguide including: a core through which light can propagate; cladding provided around the core, the cladding having an outer surface on a side thereof remote from the core and including a plurality of portions made of a material having a refractive index which varies in response to an applied electric field; and a plurality of first electrode pairs, each of the electrode pairs including two electrodes located adjacent the outer surface of the cladding and arranged to apply an electric field to a respective one of the portions of the cladding, each of the electrodes having a plurality of fingers, and the fingers of one of the electrodes of each said pair being interdigitated with the fingers of the other electrode of such pair; wherein a respective electric potential can be applied to each said pair of electrodes and, as the electric potential at one of the pairs of electrodes is changed from a first value to a second value, the refractive index of the corresponding portion of the cladding changes from a first value at which light traveling through the core and impinging on such portion of the cladding is reflected back into the core to a second value at which light traveling through the core and impinging on such portion passes through such portion and thereby escapes from the waveguide; and wherein each of the first electrode pairs is common to all of the waveguides and is arranged to simultaneously apply an electric field to the corresponding portion of the cladding of each of the waveguides; and including means for directing light into each of the waveguides.

15. A display device according to claim 14, wherein the means for directing light includes a plurality of selectively actuable light gates which are each associated with a respective waveguide, and through which light may be supplied to the associated waveguide.

16. A device according to claim 15, wherein the means for directing light includes light source means for supplying light to the light gates, the light source means including two separately controllable light sources of different colors.

* * * * *